(12) United States Patent
Aranguren et al.

(10) Patent No.: US 6,427,237 B1
(45) Date of Patent: Jul. 30, 2002

(54) NETWORK FOR DISTRIBUTING MULTIMEDIA SIGNALS OVER A PRIMARY SIGNAL DISTRIBUTION PATH

(75) Inventors: William L. Aranguren; Boris A. Bark, both of Ocean Township, Monmouth County; Leonid Strakovsky, Rumson, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/153,655

(22) Filed: Sep. 15, 1998

(51) Int. Cl.[7] .............................................. H04N 7/173
(52) U.S. Cl. ...................................... 725/106; 725/126
(58) Field of Search ........................... 455/5.1, 5.2, 6.3, 455/4.1, 4.2; 348/6, 12, 10, 11; 725/106, 126

(56) References Cited

U.S. PATENT DOCUMENTS

| 5,027,426 | A | * | 6/1991 | Chiocca, Jr. .................... 455/5 |
| 5,815,794 | A | * | 9/1998 | Williams ..................... 455/5.1 |
| 5,822,678 | A | * | 10/1998 | Evanyk ....................... 455/5.1 |
| 5,930,231 | A | * | 7/1999 | Miller et al. ................. 370/210 |

OTHER PUBLICATIONS

Simple, High–Speed Ethernet Technology for the Home—A White Paper; The Home Phoneline Networking Alliance; Jun. 1998; WWW site: www.HomePNA.org.

United States application Ser. No. 09/072,219, entitled Signal Management and Distribution System, filed May 4, 1998.

* cited by examiner

Primary Examiner—Victor R. Kostak

(57) ABSTRACT

A signal distribution network in which signals are distributed via a primary signal distribution path. Television signals are transmitted in a first frequency band, telephone signals are transmitted in a second frequency band, and data signals are transmitted in a third frequency band. Bidirectional terminal adapters are connected to each endpoint of the primary signal distribution path. The terminal adapters connect to end user devices which receive signals from the primary signal distribution path. In addition, the terminal adapters connect to signal sources which provide the signals to be distributed via the primary signal distribution path. In one embodiment, television signals received from a CATV television network are received by a television distribution module. The television distribution module has one or more tuner/converters each of which tune to a desired channel, modulate the desired channel onto at least one predetermined distribution channel, and provide the signal to the primary signal distribution path via the predetermined distribution channel. The total bandwidth of the primary signal distribution path can be substantially lower than the total bandwidth of the communication links providing the sources of signals entering the network. As such, the primary signal distribution path may be implemented utilizing a single pair of wires.

22 Claims, 3 Drawing Sheets

NETWORK FOR DISTRIBUTING MULTIMEDIA SIGNALS OVER A PRIMARY SIGNAL DISTRIBUTION PATH

FIELD OF THE INVENTION

The invention relates generally to signal distribution. More particularly, the invention relates to the distribution of multimedia signals utilizing a network with a primary signal distribution path.

BACKGROUND OF THE INVENTION

The progress of technology has resulted in an increase in the availability of telecommunication and automation services in homes. For example, homes are now equipped for interactive entertainment systems, personal communications networks, security systems, and environmental management systems.

One problem with the increase of the availability of such services is the lack of integrated management and distribution of the services throughout the home. For example, telephone service is generally provided by a local telephone company via telephone lines entering the house and telephone wires supplying telephone signals throughout the house via telephone jacks. Cable television (CATV) is provided by the CATV company via coaxial cable entering the house and being distributed to cable television outlets via a network of coaxial cable in the house. Digital broadcast systems (DBS) supply digital television programming via a satellite antenna located outside the home and a decoder in the home for decoding the desired signals for viewing. In addition to these services, which are provided by service providers, there are many other multimedia devices in a home (e.g. video cassette recorders (VCR), digital video disks (DVD), local video security/monitoring cameras, etc.), all of which are distributed locally via various wires in the home.

The management of these different services and networks is difficult, and it is often difficult and costly for a homeowner to reconfigure the services being provided to the various rooms in the house.

A current solution to this problem is the HomeStar® home wiring system available from Lucent Technologies, Inc. The HomeStar system is based on a star wiring configuration in which a central service center provides a central distribution point for all the signals that travel through the house. Distribution cables carry the signals from the service center to multi-access points (outlets) throughout the house. These outlets connect telephones, TVs, VCRs, and computers to the wiring system. The distribution cables consist of unshielded twisted pair (UTP) for the distribution of telephone and data signals, and coax cable for the distribution of video services.

Although the HomeStar system provides a satisfactory solution to the signal distribution problem, there are certain drawbacks. Since the signals are distributed using both UTP and coax, the cables which must be run through the house are of a size which makes a retrofit to the HomeStar system difficult, particularly for homes with neither basement nor attic access. Since many existing homes have older wiring schemes which are not of a star design (i.e. central distribution point), a retrofit solution is required for these homes. Further, since HomeStar uses UTP for data and telephone, and coax for video, the configuration of the services within each room of the house need to be preconfigured. For example, the homeowner may want a television (coax) outlet on the north wall of a room and a telephone (UTP) outlet on the south side of the room. If the homeowner wants to change this configuration at a later time, the outlets must be switched. Alternatively, both sides of the room can be provided with both types of outlets at the outset. This, however, can become expensive.

One solution to the problem is described in the copending commonly assigned U.S. patent application Ser. No. 09/072, 219, filed May 4, 1998, entitled "Signal Management and Distribution System", which describes a system for distributing multimedia signals throughout a home. One benefit of the system described therein is that multimedia signals can be distributed throughout the home using wires having a lower bandwidth than was previously possible. The smaller size of such wires allows for a simpler and less expensive retrofit to a star wiring architecture in the home.

However, in some existing homes, even a retrofit using the techniques described in the above referenced patent application would be difficult or impossible. This would be especially true in homes without attics, basements, and/or crawl spaces.

Thus, there is a need for an improved signal distribution technique which utilizes existing home wiring infrastructure while providing improved telecommunication, multimedia, and automation services throughout the home.

SUMMARY OF THE INVENTION

The present invention is a communication network which is made up of a primary signal distribution path with terminal adapters connected at the endpoints of the path such that the signals on the primary signal distribution path are available to all terminal adapters. A television signal distribution module distributes television signals over the primary signal distribution path in a first frequency band and telephone signals are distributed over the primary signal distribution path in a second frequency band. In an advantageous embodiment, the first frequency band carries television signals in the range of 54 MHz to 88 MHz and the second frequency band carries telephone signals in the range of 0 kHz to 3 kHz.

In accordance with another aspect of the invention, the terminal adapters have a first signal path allowing bidirectional communication of signals in the first frequency band and a second signal path allowing bidirectional communication of signals in the second frequency band. Thus, each terminal adapter may be connected to end user devices which receive signals from the primary signal distribution path. Further, each terminal adapter may be connected to a device which is a source of signals to be distributed via the primary signal distribution path.

Further, the primary distribution path may also distribute data signals in a third frequency band, which is advantageously in the range of 3 kHz to 54 MHz. In this embodiment, the terminal adapters will have a third signal path allowing bidirectional communication of signals in the third frequency band. This third frequency band may be further split to support multiple applications. Such a further split requires additional signal paths in the terminal adapters to separate out the signals in the different frequency bands.

In an advantageous embodiment, the television signals are distributed via a television signal distribution module which receives cable television signals modulated on a set of channels, for example channels 2–75. The television signal distribution module comprises tuner/converters which receive these channels, select the channel desired by a user, and convert the signals on the selected channel to at least one predetermined channel. The signal is then transmitted over the primary signal distribution path using the at least one predetermined channel.

In accordance with one benefit of the present invention, the total bandwidth of the primary signal distribution path can be substantially lower than the total bandwidth of the communication links providing the sources of signals entering the network. As such, the primary signal distribution path may be implemented utilizing a single pair of wires.

These and other advantages of the invention will be apparent to those of ordinary skill in the art by reference to the following detailed description and the accompanying drawings.

DETAILED DESCRIPTION

Figure 1:
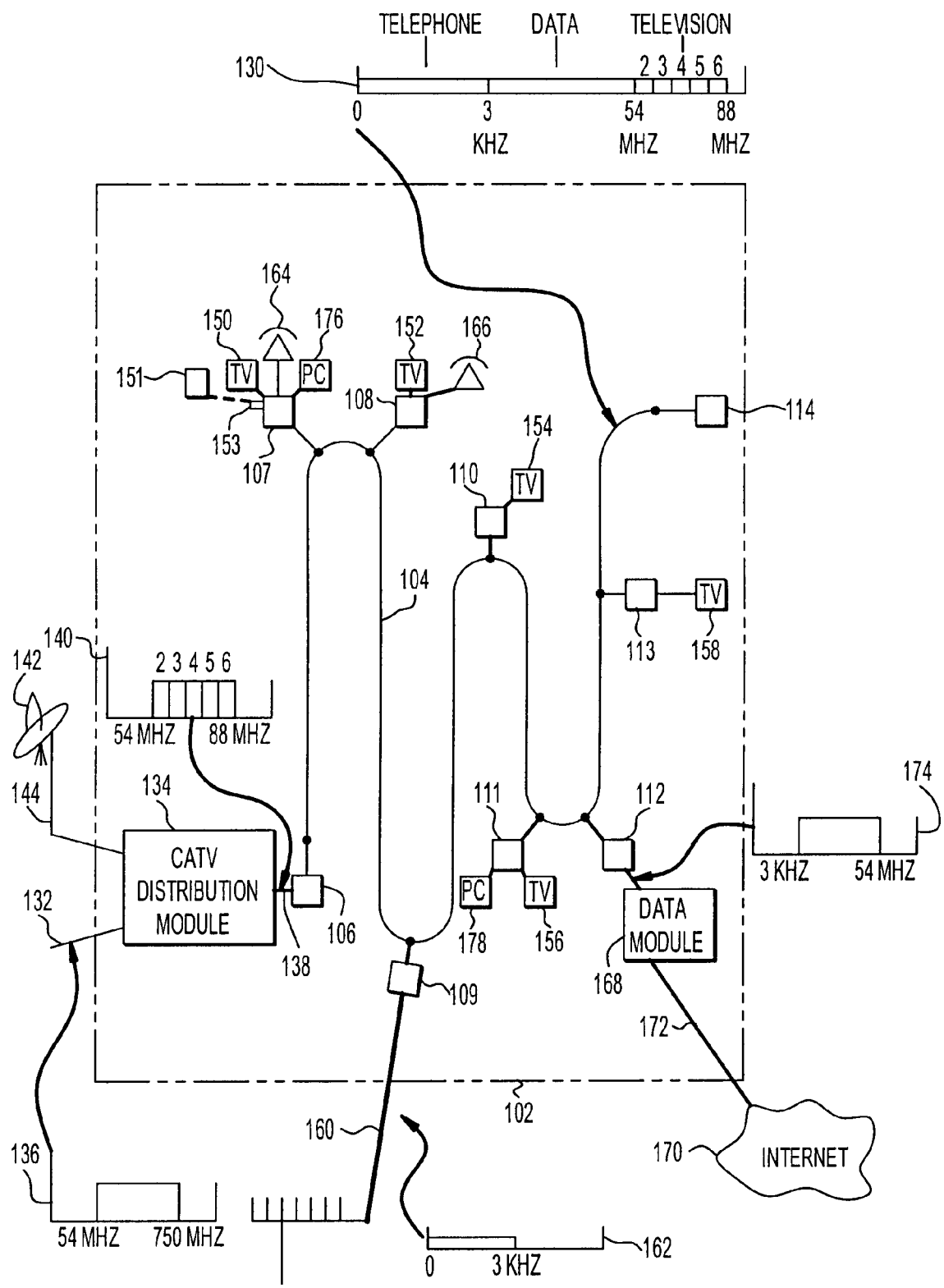
FIG. 1 shows a network configured in accordance with the present invention.

A network configured in accordance with the present invention is shown in FIG. 1. Broken line 102 represents the outline of a home (or other structure) such that components shown within broken line 102 are inside the home, while components shown outside broken line 102 are outside the home. The network includes a primary signal distribution path 104 which runs throughout the home 102. Typically, the primary signal distribution path 104 would be standard grade telephone wire of the type which would typically be found inside many existing homes. One of the benefits of the present invention is that such wiring is already found in many homes and there is no upgrade required and no retrofit of new wires into an existing home. In most cases, the principles of the present invention allow the features and services described herein to be distributed throughout the home utilizing the existing home telephone wiring.

There is little requirement as to the configuration of the primary signal distribution path 104. That is, it can be a free form network, a daisy chain network, or another design. The only requirement is that signals present on the primary signal distribution path 104 be available at all points along the path.

Terminal adapters 106, 107, 108, 109, 110, 111, 112, 113, 114 are connected to the primary signal distribution path 104 at various locations along the primary signal distribution path 104. In a typical home configuration, one terminal adapter would be located in each room in which it is desired to have the signals distributed. In addition to having one terminal adapter in each room in which it is desired that signals be distributed, a terminal adapter is also required at each endpoint of the primary signal distribution path 104. For example, terminal adapter 114 is located at an endpoint of the primary signal distribution path 104, even though there are no devices connected at that point and there is no need for signal distribution at that point. As will be described in further detail below, terminal adapters at the endpoints of the primary signal distribution path 104 provide impedance termination for the unused outputs.

In accordance with the embodiment shown in FIG. 1, there are three types of signals distributed via the network: television; telephone; and data. The frequency usage over the primary signal distribution path 104 for each of these types of signals is shown in frequency usage chart 130, which indicates that telephone signals are transmitted in the frequency range 0 kHz to 3 kHz, data signals are transmitted in the frequency range 3 kHz to 54 MHz, and television signals are transmitted in the frequency range 54 MHz to 88 MHz. With respect to the television signals, the frequency range 54 MHz to 88 MHz represents standard television channels 2 through 6. It has been determined that using standard existing telephone wires present in many homes, a practical upper frequency limit for the transmission of television signals is channel 6, or 88 MHz. However, if a higher quality transmission medium were used for the primary signal distribution path 104, then television, or other, signals could be transmitted at a frequency range higher than 88 MHz.

Standard CATV signals are received via coax cable 132 at a CATV distribution module 134. As shown in frequency usage chart 136, these CATV signals received via coax cable 132 are in the frequency range 54 MHz–750 MHz. The CATV signals are received by the CATV distribution module 134 which converts selected channels to channels 2 through 6 in the frequency range 54 MHz to 88 MHz, which is the frequency range used for television signals by the distribution network in the home 102. These signals are then output via link 138 which is connected to terminal adapter 106 so that these signals are present on the primary signal distribution path 104. Frequency usage chart 140 shows the frequency range of the television signals present on link 138.

In addition to the CATV signals received via coax cable 132, the CATV distribution module 134 also receives digital broadcast (DBS, LMDS, MMDS, LMMDS, etc.) signals from antenna 142. The antenna 142 transmits its broadband output signal to the CATV distribution module 134 via a dedicated high performance point-to-point coax cable 144 in a manner similar to the way CATV signals enter the CATV distribution module 134 via coax cable 132. A chosen one of these signals may be converted to channels 2 through 6 in the frequency range 54 MHz to 88 MHz and then output via link 138 which is connected to terminal adapter 106 so that these signals are present on the primary signal distribution path 104.

Figure 2:
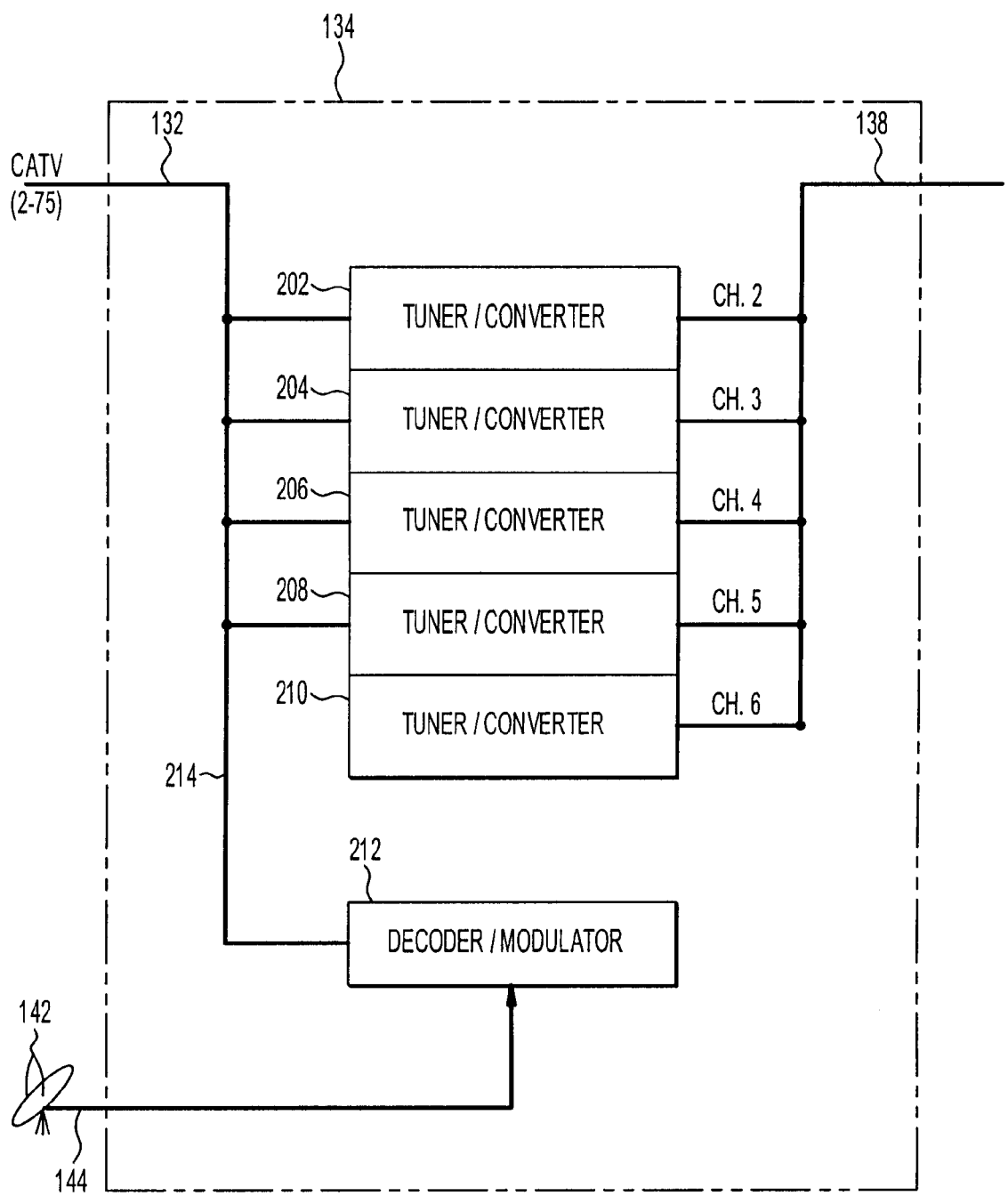
FIG. 2 is a block diagram of the CATV distribution module.

The CATV distribution module 134 is shown in further detail in FIG. 2. The CATV distribution module 134 comprises tuner/converters 202, 204, 206, 208, 210, and decoder/modulator 212. Each of these components 202–212 is connected to a common signal bus 214. Signal bus 214 could be implemented in a conventional manner using a combination of combiners, broadband amplifiers, and splitters.

The distribution of CATV signals is as follows. The CATV channels (2–75) enter the CATV distribution module 134 via coax cable 132 and the signals are distributed to the tuner/converters 202, 204, 206, 208, 210 via the common signal bus 214. Each of the tuner/converters 202, 204, 206, 208, 210 tune to a selected channel and then convert the signal of the selected channel to a pre-determined distribution channel. In the embodiment shown in FIG. 2, tuner/converter 202 converts a selected channel to distribution channel 2, tuner/converter 204 converts a selected channel to distribution channel 3, tuner/converter 206 converts a selected channel to distribution channel 4, tuner/converter 208 converts a selected channel to distribution channel 5, and tuner/converter 210 converts a selected channel to distribution channel 6.

The decoder/modulator 212 receives and distributes digital broadcast (DBS, LMDS, MMDS, LMMDS, etc.) signals from antenna 142. As described above, the antenna 142 transmits its broadband output signal to decoder/modulator 212 via the dedicated high performance point-to-point coax cable 144. Decoder/modulator 212 then decodes the signal corresponding to a chosen DBS (for example) channel in a conventional manner and modulates the signal onto a channel which is outside of the received CATV channels (2–75). For example, assume that the decoder/modulator modulates the signal onto channel 76. The modulated signal on channel 76 is then output to the common signal bus 214 and is now available to the tuner/converters 202, 204, 206, 208, 210 just like any of the CATV channels 2–75.

Thus, in operation, the television signals output from the tuner/converters 202, 204, 206, 208, 210 on channels 2, 3, 4, 5, 6, respectively, are transmitted via link 138 to terminal adapter 106 and on to primary signal distribution path 104, where they are available to televisions connected to the primary signal distribution path 104. For example, consider television 150 connected to terminal adapter 107, and assume that this television 150 is tuned to channel 2. As such, it will receive the CATV channel that tuner/converter 202 is tuned to, because tuner/converter 202 outputs its selected channel onto channel 2 for distribution throughout the home 102. In a similar manner, televisions 152, 154, 156, and 158 could be tuned to channels 3, 4, 5, and 6 respectively so that they receive the CATV channels selected by tuner converters 204, 206, 208, 210 respectively.

Thus, in order for a viewer of a television connected to the primary distribution path 104 to view a desired channel, the viewer must be able to indicate that desired channel to the appropriate tuner/converter in the CATV distribution module 134. For example, a viewer of television 154 tuned to channel 4 must be able to control tuner/converter 206 in order to view a desired television channel. One way for a viewer to control an associated tuner/converter is via a fully wireless link using radio communication. This would require an indication from the remote control to the tuner/converters indicating which of the tuner/converters is being accessed. This could be accomplished, for example, by the remote control transmitting an identification of which tuner/converter is being accessed, by each remote control being assigned a unique ID and the tuner/converters recognizing the unique ID of its associated remote control, or by each remote control transmitting at a unique frequency associated with a particular tuner/converter.

Another technique for a viewer to indicate a desired channel to the appropriate tuner/converter in the CATV distribution module 134 is to use the primary signal distribution path 104. In this embodiment, some frequency band from 3 MHz to 55 MHz is reserved for return channel indication signals. For example, an infrared remote control unit 151 associated with television 150 has an associated infrared device 153 connected to the terminal adapter 107, and the infrared device 153 is responsive to the remote control unit 150 for sending a return signal via the reserved frequency band along the signal distribution path 104 to the CATV distribution module 134. The return signal would identify the appropriate tuner/converter to be controlled and the desired channel.

It is noted that although CATV distribution module 134 is shown in FIG. 2 as containing five tuner/converters, the principles of the present invention could be practiced with as few as one tuner/converter. In such an embodiment, the single tuner/converter could be a common VCR or cable television box, either of which can tune to a selected channel and convert the signal of the selected channel to a predetermined distribution channel. Of course, such an embodiment is limited in that all televisions connected to the primary signal distribution path would be tuned to the same predetermined distribution channel and would receive the same selected channel.

Telephone signals enter the home 102 in a conventional manner via the telephone network twisted pair wire 160. Frequency usage chart 162 indicates that telephone signals are transmitted in the frequency range 0 kHz to 3 kHz. The twisted pair wire 160 is connected to the primary signal distribution path 104 via terminal adapter 109. The telephone signals are transmitted throughout the house via primary signal distribution path 104 and are available to telephones, for example telephone 164, in a conventional manner. Of course, although only one telephone 164 is shown connected to primary signal distribution path 104, multiple telephones could be connected to various terminal adapters and could be used as extension telephones.

The home network also includes a data module 168 for managing the distribution of data signals throughout the network. As described above, data signals are distributed throughout the primary signal distribution path 104 in the frequency range 3 kHz to 54 MHz. The data module 168 may be used, for example, for network administration for computers in the home, such as computers 176 and 178, by implementing well known data network protocols. Computers 176 and 178 must be configured such that they send and receive data signals in the data frequency band 3 kHz to 54 MHz. Further, the data module 168 may be the interface point for access to external data networks, such as the Internet 170. If used as an interface to the Internet 170, the data module 168 will be connected to the Internet 170 via link 172, which may be a standard telephone link in which case the data module 168 will connect to the Internet 170 via a dial-up connection. Alternatively, the link 172 may be some other type of well known direct connection to the Internet (e.g. cable modem, IDSL, T1, ISDN). In either case, upon receipt of data from the Internet 170, the data module 168 will modulate the received data onto frequency range 3 kHz to 54 MHz as shown by frequency usage chart 174. The data module 168 may be implemented utilizing an appropriately configured general purpose computer which contains computer program instructions for carrying out the required data functions.

The data module 168 could also be used to distribute other types of digital data in addition to digital data used by computers in the home. For example, the data module 168 could receive digital television signals from a digital television signal source and could distribute those signals over the primary signal distribution path 104 via the data frequency band. Further, the data module is not limited to distributing only digital data. For example, suppose that the data module 168 received and distributed digital television signals as described above. It is also possible for the data module 168 to convert those digital television signals into analog television signals. In such a case, the data module 168 could transmit those analog television signals over an unused portion of the television frequency band.

Figure 3:
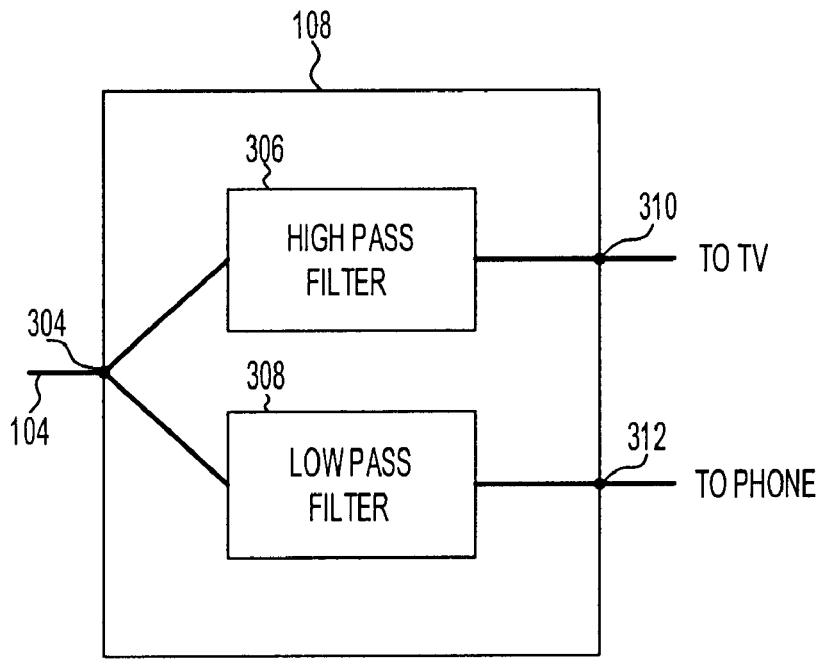
FIG. 3 is a block diagram of a terminal adapter having three ports.
Figure 4:
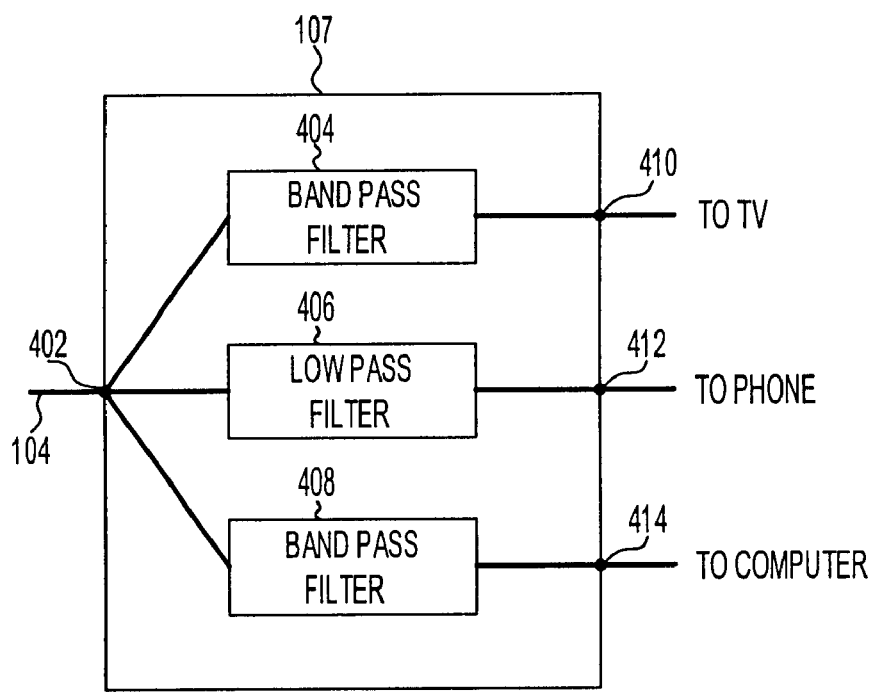
FIG. 4 is a block diagram of a terminal adapter having four ports.

Further details of the terminal adapters is described in conjunction with FIGS. 3 and 4. FIG. 3 shows details of terminal adapter 108 which is used to connect television 152 and telephone 166 to the primary signal distribution path 104. Terminal adapter 108 includes a port 304 for connection to the primary signal distribution path 104. Port 304 is also connected to a high pass filter 306 and a low pass filter 308. High pass filter 306 is connected to port 310, which is connected to the television 152. Low pass filter 308 is connected to port 312, which is connected to telephone 166.

The terminal adapter 108 operates as follows. Consider that television, telephone, and data signals are present on primary signal distribution path 104 and enter the terminal adapter 108 at port 304. High pass filter 306 will only pass the television signals at or above 54 MHz while the data and telephone signals at lower frequencies will be filtered out. Thus, only the appropriate television signals will pass through port 310 to television 152. This will ensure proper operation of the television 152. Low pass filter 308 will only pass the telephone signals at or below 3 kHz while the data and television signals at higher frequencies will be filtered out. Thus, only the appropriate telephone signals will pass through port 312 to telephone 166. This will ensure proper operation of the telephone 166.

In accordance with one of the principles of the present invention, the terminal adapter allows signals to pass in both directions to/from the primary signal distribution path 104. For example, telephone 166 will send signals to the primary signal distribution path 104 for transmission to the telephone network. As such, telephone signals in the frequency range of 0 kHz To 3 kHz from telephone 166 will pass through port 312, low pass filter 308, and port 304 to the primary signal distribution path 104. However, if the telephone 166 emits any signals outside of that frequency range, the low pass filter will prevent those signals from entering the primary signal distribution path 104 and thus preventing the possible interference with the television and/or data signals present on the primary signal distribution path 104. One skilled in the art would recognize that the terminal adapter 108 could be implemented with other types of filters, such as band pass filters, instead of the high and low pass filters shown in FIG. 3.

Details of terminal adapter 107, having ports for television, telephone, and data signals is shown in further detail in FIG. 4. Terminal adapter 107 includes a port 402 for connection to the primary signal distribution path 104. Port 402 is also connected to band pass filters 404, 408 and low pass filter 406. Band pass filter 404 is connected to port 410, which is connected to the television 150. Low pass filter 406 is connected to port 412, which is connected to telephone 164. Band pass filter 408 is connected to port 414, which is connected to computer 176. The terminal adapter 107 operates as follows. Consider that television, telephone, and data signals are present on primary signal distribution path 104 and enter the terminal adapter 108 at port 402. Band pass filter 404 will only pass the television signals within the frequency band 54 MHz to 88 MHz while the data and telephone signals will be filtered out. Thus, only the appropriate television signals will pass through port 410 to television 150. This will ensure proper operation of the television 150. Low pass filter 406 will only pass the telephone signals within the frequency band 0 kHz to 3 kHz while the data and television signals will be filtered out. Thus, only the appropriate telephone signals will pass through port 412 to telephone 164. This will ensure proper operation of the telephone 164. Band pass filter 408 will only pass the data signals within the frequency band 3 kHz to 54 MHz while the telephone and television signals will be filtered out. Thus, only the appropriate data signals will pass through port 414 to computer 176. This will ensure proper operation of the computer 176.

Although FIG. 4 shows a single band pass filter 408 used in connection with the data frequency band, in an alternate embodiment, terminal adapter 107 could have multiple band pass filters used in connection with the data frequency band. In effect, this would break up the data frequency band into smaller bands which could each be used for a different application (e.g. computer network, HDTV, network control, etc.).

As stated above, a terminal adapter is required at each endpoint of the primary signal distribution path 104. Each endpoint of the primary signal distribution path must provide for impedance termination. With respect to the television signals, if there is a television connected to the appropriate port of the terminal adapter, then the resistance provided by the television will provide the required impedance termination. However, if there is no television connected at the endpoint, then an appropriate resistance must be provided at the endpoint by connecting a resistor to the unused television port of the terminal adapter at the endpoint. An appropriate resistor for this purpose will have a resistance appropriate for the design of the network. One skilled in the art could readily determine the appropriate resistance required at the unused television ports at the endpoints of the network based on the characteristics of the primary signal distribution path, filter design, and television standards. The resistor will absorb the energy present at the endpoint of the primary signal distribution path and will prevent the energy from being reflected back along the primary signal distribution path 104 which would result in interference of the television signals. It is noted that such resistance is not required for the unused telephone ports because the telephone signals are transmitted in the low frequency band such that there is no danger of reflected signals. With respect to the unused data ports, if the upper portion of the data frequency band (approximately 40–54 MHz) is being used, then resistance at the unused data ports of the terminal adapters must be provided.

As described above in connection with FIG. 3, the terminal adapter 107 allows signals to pass in both directions. Thus, computer 176 can transmit data in the data frequency band to the primary signal distribution path 104 via port 414, band pass filter 408, and port 402. The band pass filter 408 will prevent any signals emitted by the computer outside of the data frequency band from interfering with television or telephone signals on the primary signal distribution path 104. Similarly, telephone 164 can transmit data in the telephone frequency band to the primary signal distribution path 104 via port 412, low pass filter 406, and port 402. The low pass filter 406 will prevent any signals emitted by the telephone outside of the telephone frequency band from interfering with television or data signals on the primary signal distribution path 104.

In accordance with one benefit of the invention, since the terminal adapters provide for bi-directional communication, the same terminal adapters may be used for both signal sources and end user devices. Thus, as shown in FIG. 1, CATV distribution module 134 is connected to terminal adapter 106. The CATV distribution module 134 would be connected to the television port of the terminal adapter 106. If the CATV distribution module were connected to a different terminal adapter, then the television port of terminal adapter 106 could be used to connect to a television. Similarly, telephone network twisted pair is connected to the telephone port of terminal adapter 109, and data module 168 is connected to the data port of terminal adapter 112. The configuration of the terminal adapters in accordance with the present invention provides for a very flexible home network.

In an advantageous embodiment, the terminal adapters in accordance with the invention may be implemented in a wall outlet which can be mounted in the walls in the rooms of the home. In such an embodiment, the wall outlets will contain the required components and circuitry, and the ports will accommodate the appropriate devices.

In accordance with another benefit of the present invention, the total usable bandwidth of the primary signal distribution path 104 can be substantially less than the bandwidth of the signal paths (coax cable 132, telephone network twisted pair 160, digital broadcast point-to-point coax cable 144, and data link 172) providing signals to the home. One of the techniques which allows this benefit is that only the selected CATV channels, rather than all available CATV channels, are transmitted along the primary signal distribution path 104. Thus, all CATV channels are available for viewing throughout the home, but they are not all present on the primary signal distribution path 104 at the same time.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A communication network for distributing a plurality of electrical signals within a building structure, the network comprising:
   one primary signal distribution path substantially housed within said building structure;
   a plurality of terminal adapters connected to said primary signal distribution path such that any of said plurality of electrical signals on said primary signal distribution path are available to each of said terminal adapters;
   a television signal distribution module connected to a terminal adapter for transmitting television signals over said primary signal distribution path in a first frequency band; and
   a terminal adapter connected to the public telephone network for transmitting and receiving telephone signals over said primary signal distribution path in a second frequency band;
   wherein every endpoint of said primary signal distribution path is connected to a terminal adapter.

2. The communication network of claim 1 wherein each terminal adapter further comprises at least one output port, and an impedance termination is provided for each unused output port among the plurality of terminal adapters.

3. The communication network of claim 1 wherein said terminal adapters communicate signals bidirectionally.

4. The communication network of claim 1 wherein said television signal distribution module further comprises:
   a first input port for receiving signals modulated on a first plurality of channels including channels outside of said first frequency band;
   a plurality of tuner/converters connected to said input port for receiving said signals, for tuning to a selected one of said plurality of channels, and for converting said signals on said selected channel to at least one predetermined channel within said first frequency band; and
   at least one output port connected to a terminal adapter for transmitting signals via said at least one predetermined channel.

5. The communication network of claim 1 wherein said terminal adapters further comprise:
   a first filter for filtering signals outside of said first frequency band;
   a second filter for filtering signals outside of said second frequency band;
   a first port connected to said first and second filters;
   a second port connected to said first filter; and
   a third port connected to said second filter.

6. The communication network of claim 5 wherein:
   said first filter is a band pass filter; and
   said second filter is a low pass filter.

7. The communication network of claim 5 wherein:
   said first filter is a high pass filter; and
   said second filter is a low pass filter.

8. The communication network of claim 1 further comprising:
   a second signal distribution module connected to a terminal adapter for transmitting signals over said primary signal distribution path in a third frequency band.

9. The communication network of claim 8 wherein said terminal adapters further comprise:
   a first filter for filtering signals outside of said first frequency band;
   a second filter for filtering signals outside of said second frequency band;
   a third filter for filtering signals outside of said third frequency band;
   a first port connected to said first, second and third filters;
   a second port connected to said first filter;
   a third port connected to said second filter; and
   a fourth port connected to said third filter.

10. The communication network of claim 8 wherein said terminal adapters further comprise:
    a first filter for filtering signals outside of said first frequency band;
    a second filter for filtering signals outside of said second frequency band;
    a plurality of bandpass filters for passing signals within frequency bands which are within said third frequency band;
    a first port connected to said first filter, said second filter, and said plurality of bandpass filters;
    a second port connected to said first filter;
    a third port connected to said second filter; and
    a plurality of ports each connected to one of said plurality of bandpass filters.

11. The communication network of claim 8 wherein:
    said first frequency band carries television signals in the range of 54 MHz to 88 MHz;
    said second frequency band carries telephone signals in the range of 0 kHz to 3 kHz.; and
    said third frequency band carries data signals in the range of 3 kHz to 54 MHz.

12. The communication network of claim 1 wherein said terminal adapters are connected to said primary signal distribution path in a daisy chain configuration.

13. The communication network of claim 1, wherein said terminal adapters are connected to said primary signal distribution path in a free form configuration.

14. The communication network of claim 1 wherein:
    said first frequency band carries television signals in the range of 54 MHz to 88 MHz; and
    said second frequency band carries telephone signals in the range of 0 kHz to 3 kHz.

15. The communication network of claim 1 wherein said primary signal distribution path comprises a single pair of wires.

16. The communication network of claim 1 wherein said terminal adapters are connected to end user devices and are configured to receive signals from said end user devices for distribution via said primary signal distribution path.

17. The communication network of claim 1 wherein the bandwidth of said primary signal distribution path is substantially lower than the total bandwidth of the communication links providing signals to the communication network.

18. A communication network for distributing a plurality of electrical signals within a building structure, the network comprising:

one primary signal distribution path substantially housed within said building structure;

a plurality of terminal adapters connected to every endpoint of said primary signal distribution path such that any of said plurality of electrical signals on said primary signal distribution path are available to each of said terminal adapters;

a first signal distribution module connected to a first one of the plurality of terminal adapters for transmitting television signals over said primary signal distribution path in a first frequency band of 54 MHz to 88 MHz; and a second one of the plurality of terminal adapters connected to the public telephone network for transmitting and receiving telephone signals over said primary signal distribution path in a second frequency band of 0 kHz to 3 kHz.

19. The communication network of claim 18 wherein said television signal distribution module further comprises:

a first input port for receiving signals modulated on a first plurality of channels including channels outside of said first frequency band;

a plurality of tuner/converters connected to said input port for receiving said signals, for tuning to a selected one of said plurality of channels, and for converting said signals on said selected channel to at least one predetermined channel within said first frequency band; and at least one output port connected to a terminal adapter for transmitting signals via said at least one predetermined channel.

20. A communication network for distributing a plurality of electrical signals within a building structure, the network comprising:

a primary signal distribution path substantially housed within said building structure;

a plurality of bidirectional terminal adapters connected to said primary signal distribution path such that any of said plurality of electrical signals on said primary signal distribution path are available to each of said terminal adapters;

said bidirectional terminal adapters further comprising:
a first signal path allowing bidirectional communication of signals in a first frequency band;
a second signal path allowing bidirectional communication of signals in a second frequency band;
a third signal path allowing bidirectional communication of signals in a third frequency band;
a first port connected to said first signal path and configured to connect to a first type of end user device;
a second port connected to said second signal path and configured to connect to a second type of end user device;
a third port connected to said third signal path and configured to connect to a third type of end user device; and
a fourth port connected to said first, second and third signal paths;
wherein said first type of end user device is a television, said second type of end user device is a telephone, and said third type of end user device is a computer.

21. The communication network of claim 20 wherein:

said first frequency band carries television signals in the range of 54 MHz to 88 MHz;

said second frequency band carries telephone signals in the range of 0 kHz to 3 kHz.; and said third frequency band carries data signals in the range of 3 kHz to 54 MHz.

22. A communication network for distributing a plurality of electrical signals within a building structure, the network comprising:

a primary signal distribution path substantially housed within said building structure;

a plurality of bidirectional terminal adapters connected to said primary signal distribution path such that any of said plurality of electrical signals on said primary signal distribution path are available to each of said terminal adapters;

said bidirectional terminal adapters further comprising:
a first signal path allowing bidirectional communication of signals in a first frequency band;
a second signal path allowing bidirectional communication of signals in a second frequency band;
a first port connected to said first signal path and configured to connect to a first type of end user device;
a second port connected to said second signal path and configured to connect to a second type of end user device; and
a third port connected to said first and second signal paths and to said primary signal distribution path;
wherein:
said first frequency band carries television signals in the range of 54 MHz to 88 MHz; and
said second frequency band carries telephone signals in the range of 0 kHz to 3 kHz.

\* \* \* \* \*